(12) United States Patent
Paul (10) Patent No.: US 8,248,385 B1
(45) Date of Patent: Aug. 21, 2012

(54) USER INPUTS OF A TOUCH SENSITIVE DEVICE

(75) Inventor: Sean Paul, Elora (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,967

(22) Filed: Sep. 30, 2011

Related U.S. Application Data (63) Continuation of application No. 13/231,657, filed on Sep. 13, 2011.

(51) Int. Cl.
*G06F 3/041* (2006.01)
*G06F 3/045* (2006.01)

(52) U.S. Cl. .................................. 345/173; 345/174

(58) Field of Classification Search .................. 345/173
See application file for complete search history.

(56) References Cited

U.S. PATENT DOCUMENTS

| | | | |
|---|---|---|---|
| 2004/0046744 | A1 | 3/2004 | Rafii et al. |
| 2008/0042994 | A1* | 2/2008 | Gillespie et al. ............ 345/174 |
| 2011/0050576 | A1* | 3/2011 | Forutanpour et al. ........ 345/168 |
| 2011/0154390 | A1* | 6/2011 | Smith ............................ 725/32 |
| 2011/0221684 | A1* | 9/2011 | Rydenhag ..................... 345/173 |

OTHER PUBLICATIONS

"How can I capture the amount of surface area that the user is making contact with the iPhone screen?" stackoverflow [online]. First accessed on Apr. 7, 2011. Retrieved from the Internet: <http://stackoverflow.com/questions/3030114/how-can-i-capture-the-amount-of-surface-area-that-the-user-is-making-contact-with> (2 pgs.).

"Couple problems with virtual keyboards," IAmA Cosmopolite AMA [online]. First accessed on Mar. 29, 2011. Retrieved from the Internet: <http://neouto.wordpress.com/2011/02/23/one-problem-with-virtual-keyboards/> (6 pgs.).

"Finger radius / finger pressure?" Unity Technologies [online]. First accessed on Apr. 7, 2011. Retrieved from the Internet: <http://forum.unity3d.com/threads/70184-Finger-radius-finger-pressure> (3 pgs.).

Coldewey, "LiquidKeyboard Makes Virtual Keyboards More Fluid," TechCrunch [online]. First accessed on Mar. 29, 2011. Retrieved from the Internet: <http://techcrunch.com/2011/01/26/liquidkeyboard-makes-virtual-keyboards-more-fluid/> (2 pgs.).

"Multi-touch keyboard question," NotionAddicts! [online]. First accessed on Mar. 29, 2011. Retrieved from the Internet: <http://www.notionaddicts.com/forums/showthread.php/968-multi-touch-keyboard-question> (5 pgs.).

"Typing test," iPadFORUMS.net [online]. First accessed on Mar. 29, 2011. Retrieved from the Internet: <http://www.ipadforums.net/ipad-general-discussions/2584-typing-test.html> (4 pgs.).

"iPad Pressure Demonstration," YouTube [online]. First accessed on Mar. 29, 2011. Retrieved from the Internet: <http://www.youtube.com/watch?v=OgTcyjzXfTg> (3 pgs.).

U.S. Appl. No. 13/231,657, by Sean Paul, filed Sep. 13, 2011.

* cited by examiner

*Primary Examiner* — Alexander S Beck
*Assistant Examiner* — Charles V Hicks
(74) *Attorney, Agent, or Firm* — Shumaker & Sieffert, P.A.

(57) ABSTRACT

Various aspects of this disclosure are directed to displaying, by a touch-sensitive display of a computing device, at least one selectable object, and receiving, by the computing device, a user input comprising a gesture at a location of the touch-sensitive display that displays the at least one selectable object. The computing device may determine a time duration of the gesture. When the time duration of the gesture is greater than or equal to a minimum timeout value and less than or equal to a maximum timeout value, the computing device may select as user input the at least one selectable object.

9 Claims, 6 Drawing Sheets

USER INPUTS OF A TOUCH SENSITIVE DEVICE

This application is a continuation of U.S. Application No. 13/231,657, filed Sep. 13, 2011, the entire content of which is incorporated herein by reference.

BACKGROUND

A user may interact with applications executing on a computing device (e.g., a mobile phone, tablet computer, smart phone, desktop computer, or the like). For instance, a user may send one or more user inputs configured to cause the computing device to install, display or delete an application stored at the computing device.

In some examples, a computing device may include a touch-sensitive display that may enable a user to interact with the computing device. For instance, an application executing on a computing device may cause a touch-sensitive display to display a graphical keyboard that may enable a user to register key presses by touching certain areas of the graphical keyboard.

SUMMARY

In one example, a method includes displaying, by a touch-sensitive display of a computing device, at least one selectable object, and receiving, by the computing device, a user input comprising a gesture at a location of the touch-sensitive display that displays the at least one selectable object. The method further comprises determining, by the computing device, a time duration of the gesture, and when the time duration of the gesture is greater than or equal to a minimum timeout value and less than or equal to a maximum timeout value, selecting as user input, by the computing device, the at least one selectable object.

In one example, a computer-readable storage medium is encoded with instructions that cause one or more processors of a computing device to display, by a touch-sensitive display of the computing device, at least one selectable object, and receive a user input comprising a gesture at a location of the touch-sensitive display that displays the at least one selectable object. The computer-readable storage medium is further encoded with instructions that cause the one or more processors of the computing device to determine a time duration of the gesture, and when the time duration of the gesture is greater than or equal to a minimum timeout value and less than or equal to a maximum timeout value, select as user input the at least one selectable object.

In one example, a computing device includes one or more processors, and a touch-sensitive display to display at least one selectable object and receive a user input comprising a gesture at a location of the touch-sensitive display that displays the at least one selectable object. The computing device further includes an application installed on the computing device and operable by the one or more processors to determine a time duration of the gesture, and when the time duration of the gesture is greater than or equal to a minimum timeout value and less than or equal to a maximum timeout value, select as user input the at least one selectable object.

In one example, a method includes displaying, by a touch-sensitive display of a computing device, at least one selectable object, and receiving, by the computing device, a user input comprising a gesture at a location of the touch-sensitive display that displays the at least one selectable object, wherein the gesture comprises motion of an input unit. The method further includes detecting, by the computing device, a surface area of a portion of the touch-sensitive display that is in contact with the input unit, detecting, by the computing device, a change in the surface area of the portion of the touch-sensitive display that is in contact with the input unit, and when the change in the surface area is greater than or equal to a minimum value and less than or equal to a maximum value, selecting as user input, by the computing device, the at least one selectable object.

In one example, a computer-readable storage medium is encoded with instructions that cause one or more processors of a computing device to display, by a touch-sensitive display of the computing device, at least one selectable object, and receive a user input comprising a gesture at a location of the touch-sensitive display that displays the at least one selectable object, wherein the gesture comprises motion of an input unit. The computer-readable storage medium is further encoded with instructions that cause the one or more processors of the computing device to detect a surface area of a portion of the touch-sensitive display that is in contact with the input unit, detect a change in the surface area of the portion of the touch-sensitive display that is in contact with the input unit, and when the change in the surface area is greater than or equal to a minimum value and less than or equal to a maximum value, select as user input the at least one selectable object.

In one example, a computing device includes one or more processors, and a touch-sensitive display to display at least one selectable object and receive a user input comprising a gesture at a location of the touch-sensitive display that displays the at least one selectable object, wherein the gesture comprises motion of an input unit. The computing device further includes an application installed on the computing device and operable by the one or more processors to detect a surface area of a portion of the touch-sensitive display that is in contact with the input unit, detect a change in the surface area of the portion of the touch-sensitive display that is in contact with the input unit, and when the change in the surface area is greater than or equal to a minimum value and less than or equal to a maximum value, select as user input the at least one selectable object.

The details of one or more aspects of this disclosure are set forth in the accompanying drawings and the description below. Other features, objects, and advantages of the disclosure will be apparent from the description and drawings, and from the claims.

DETAILED DESCRIPTION

Computing devices, such as mobile phones, tablet computers, smart phones, laptop computers, and the like, may include touch-sensitive displays that may enable a user to interact with the computing device by touching certain areas of the touch-sensitive display. For example, an application executing on one or more processors of a computing device may cause a touch-sensitive display of the computing device to display a graphical keyboard. A user may provide a user input that may cause the computing device to select a character key of the graphical keyboard as user input by touching the area of the touch-sensitive display that displays the character key of the graphical keyboard.

In some examples, a user may wish to rest his or her fingers on the touch-sensitive screen (e.g., on the home row keys of the graphical keyboard) to prevent wrist fatigue. However, with conventional touch-sensitive displays, when the user rests his or her fingers on the graphical keyboard, the user may inadvertently cause the computing device to select one or more character keys as user input.

One or more aspects of this disclosure may enable a user to rest his or her fingers on a touch-sensitive display of a computing device without causing the computing device to register undesired key presses. For example, an application executing on one or more processors of the computing device may determine that a key press includes a gesture provided at the touch-sensitive screen that occurs within a time duration that is less than or equal to a maximum timeout value. If the gesture does not occur within the time duration that is less than or equal to the maximum timeout value, the gesture may not be interpreted as a key press. For instance, an application executing on one or more processors of a computing device may determine that a key press includes a user performing a tap gesture at a displayed character key within a threshold time period. The tap gesture may include touching a displayed character key (e.g., with a finger or other input device such as a stylus or pen), and releasing the character key.

The application may interpret the tap gesture as a key press if the gesture is performed within a time duration that is less than or equal to a maximum timeout value. For example, a user may touch a character key of the graphical keyboard with his or her finger. If the user releases the character key within a time duration that is less than or equal to a maximum timeout value, the application may interpret the gesture as a key press. If, however, the user does not release the character key within a time duration that is within a maximum timeout value, the application may not interpret the gesture as a key press when the character key is released. As such, a user may rest his or fingers on the touch-sensitive display (e.g., the home row keys) without providing a user input to cause the application executing on one or more processors of the computing device to register a key press.

In some examples, an application executing on one or more processors of a computing device may eliminate inadvertent key presses by measuring a change in a surface area corresponding to a user's finger as it is detected by a touch-sensitive display. For example, an increase in the size of the surface area corresponding to a user's finger in contact with a touch-sensitive display may indicate that the force applied by the user's finger to the character key has increased. An increase in force may correspond to a user pressing on the touch-sensitive screen to select the character key.

Figure 1:
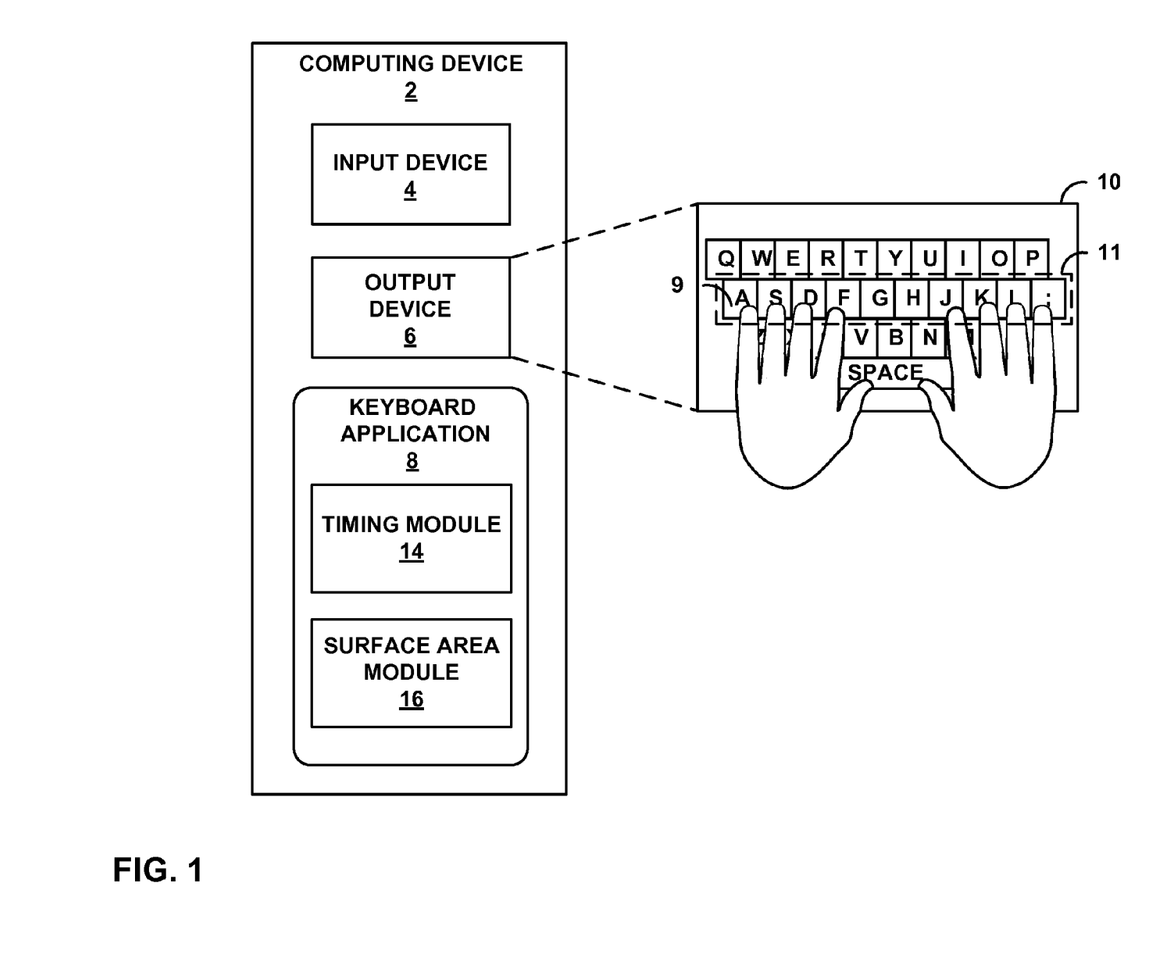
FIG. 1 is a block diagram illustrating an example of a computing device that is configured to execute a keyboard application.

FIG. 1 is a block diagram illustrating an example of a computing device that is configured to execute a keyboard application. As illustrated in FIG. 1, computing device 2 may include input device 4 and output device 6. Computing device 2 may be configured to execute keyboard application 8, which may cause output device 6 to display graphical keyboard 10. Keyboard application 8 may further include timing module 14 and surface area module 16. Examples of computing device 2 may include, but are not limited to, portable or mobile devices such as cellular phones, tablet computers, personal digital assistance (PDAs), portable gaming devices, portable media players, and e-book readers, as well as non-portable devices such as desktop computers.

Input device 4, in some examples, is configured to receive input from a user through tactile, audio, or video feedback. Examples of input device 4 may include a touch-sensitive and/or a presence-sensitive screen, mouse, keyboard, voice responsive system, or any other type of device for detecting a command from a user. In some examples, input device 4 may include a touch-sensitive display, mouse, keyboard, microphone, or video camera.

Output device 6, in certain examples, may be configured to provide output to a user using tactile, audio, or video stimuli. Output device 6, in one example, includes a touch-sensitive display, sound card, video graphics adapter card, or any other type of device for converting a signal into an appropriate form understandable to humans or machines. Additional examples of output device 6 may include a speaker, a cathode ray tube (CRT) monitor, a liquid crystal display (LCD), an organic light emitting diode (OLED), or any other type of device that can generate intelligible output to a user. Output device 6 may present the content of computing device 2 to a user. For example, output device 6 may present a web browser, or other output that may need to be presented to a user. In some examples, output device 6 may be a touch screen that can allow a user to provide one or more user inputs to interact with computing device 2.

Keyboard application 8, executing on computing device 2, may provide one or more signals to cause output device 6 (e.g., a touch-sensitive display) to display graphical keyboard 10. In some examples, a user may provide a user input to cause computing device 2 to select one or more character keys of graphical keyboard 10 by touching the area of output device 6 that displays the character key of graphical keyboard 10. For instance, a user may perform a tap gesture at a displayed character key of graphical keyboard 10, such as character key 9. The tap gesture may include touching a displayed character key and releasing the character key. In some examples, as when output device 6 includes a presence-sensitive display, touching output device 6 may be accomplished by bringing an input device such as a finger, a stylus, a pen, and the like, within proximity of output device that is sufficiently close to enable output device 6 to detect the presence of the input device. As such, touching a displayed character key of graphical keyboard 10 may, in some examples, not include actual physical contact between an input device and graphical keyboard 10. Similarly, in certain examples, as when output device 6 includes a presence-sensitive display, releasing a displayed character key of graphical keyboard 10 may be accomplished by removing the input device from the detectable range of output device 6.

In some examples, a user may provide user input that causes keyboard application 8 to refrain from selecting a character key of graphical keyboard 10. For instance, a user may perform a tap gesture at a character key of graphical keyboard 10 that may cause application 8 to configure computing device 2 to refrain from selecting the character key as user input when the duration of the gesture is greater than a maximum timeout value. For example, as illustrated in FIG. 1, a user may rest his or her fingers on home row keys 11 of graphical keyboard 10. Keyboard application 8 may determine that the user has provided one or more user inputs to select the home row keys by touching them. The user may release one or more of the selected keys by removing one or more fingers from the touch-sensitive display. Keyboard application 8 may determine that the user has performed a tap gesture at the one or more keys that have been released. Timing module 14 of keyboard application 8 may determine a duration of a gesture by comparing a first time at which the character is touched to a second time at which the character is released. In some examples, if the duration of the gesture is greater than a maximum timeout value (e.g., three hundred milliseconds), timing module 14 may cause computing device 2 to refrain from selecting the character as user input. As such, a user may rest his or her fingers on the touch-sensitive display without providing user input to register key presses if the user does not release the character within a time duration that is less than or equal to the maximum timeout value.

In certain examples, keyboard application 8 may eliminate inadvertent key presses by measuring a change in a surface area corresponding to a user's finger as it is detected by a touch-sensitive display, such as output device 6. As one example, as illustrated in FIG. 1, a user may rest his or her fingers on the home row character keys of graphical keyboard 10. Surface area module 16 of keyboard application 8 executing on one or more processors of computing device 2 may determine the surface area corresponding to each of the user's fingers in contact with graphical keyboard 10. Surface area module 16 may detect a change in the surface area of each of the portions of the touch-sensitive display that is in contact with the user's fingers (e.g., the home row keys). Surface area module 16 may cause computing device 2 to refrain from selecting the character keys as user input when the change in the surface area is less than a minimum value.

For instance, a user may press down on a character key with his or her finger. Such an increase in force may cause the surface area of the user's finger that is in contact with the touch-sensitive display to increase. Surface area module 16 may compare the change in surface area to a minimum value and may cause computing device 2 to select the character key as user input when the change in surface area exceeds the minimum value. In contrast, when a user simply rests his or her fingers on the touch-sensitive display (e.g., resting on the home row keys of graphical keyboard 10), a change in detected surface area corresponding to the user's fingers in contact with graphical keyboard 10 may not exceed the minimum value. In such an example, surface area module 16 executing on one or more processors of computing device 2 may cause computing device 2 to refrain from selecting the character keys of graphical keyboard 10 in contact with the user's fingers as user input. As such, techniques of this disclosure may enable a user to rest his or her fingers on a touch-sensitive display, such as on the home row keys of a graphical keyboard displayed by output device 6, without causing computing device 2 to register unintended key presses.

Figure 2:
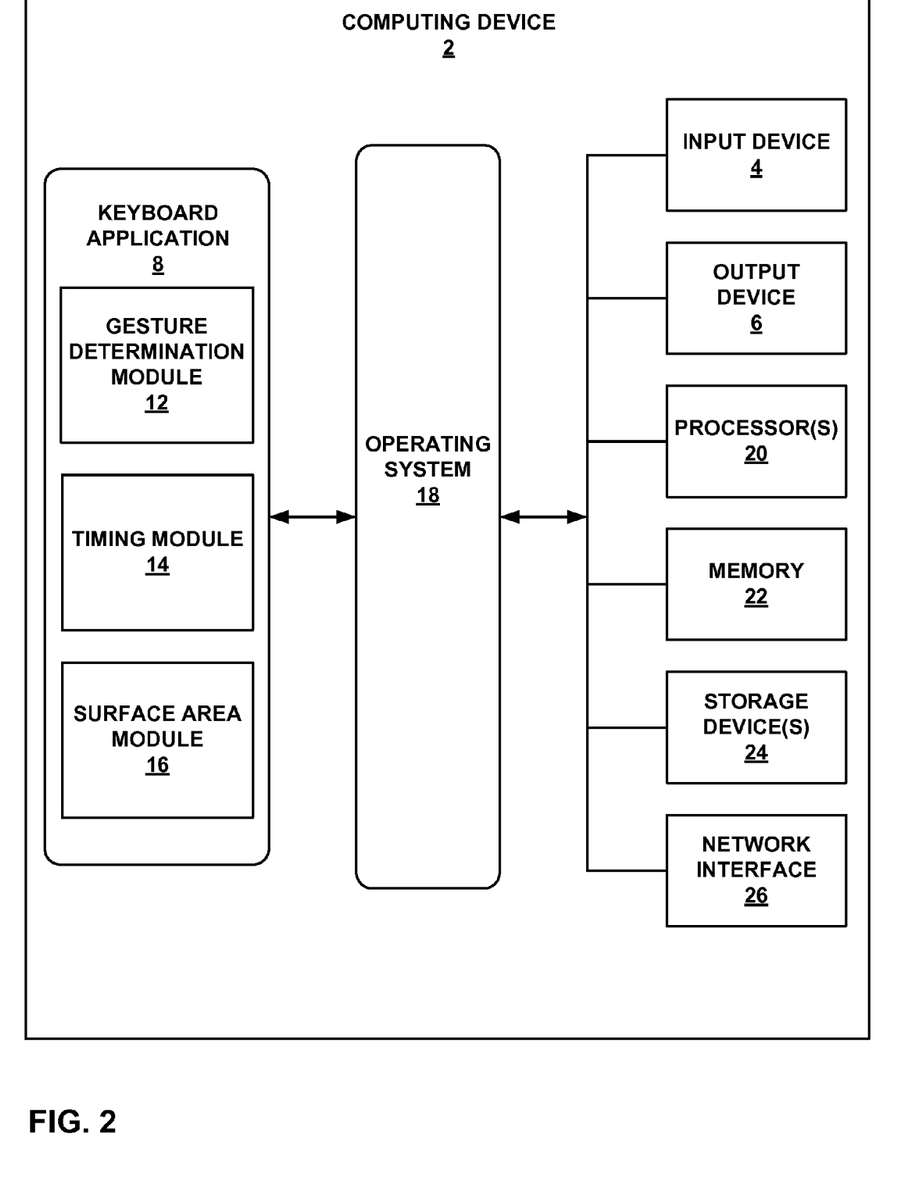
FIG. 2 is a block diagram illustrating further details of one example of the computing device shown in FIG. 1.

FIG. 2 is a block diagram illustrating further details of one example of the computing device shown in FIG. 1, in accordance with one or more aspects of the present disclosure. FIG. 2 illustrates only one particular example of computing device 2, and many other example embodiments of computing device 2 may be used in other instances.

As shown in the specific example of FIG. 2, computing device 2 includes input device 4, output device 6, one or more processors 20, memory 22, one or more storage devices 24, and network interface 26. Computing device 2 also includes operating system 18, which may include modules that are executable by computing device 2. Computing device 2, in one example, further includes keyboard application 8 that is also executable by computing device 2. Keyboard application 8 includes gesture determination module 12, timing module 14, and surface area module 16. Each of components 8, 12, 14, 16, 18, 4, 6, 20, 22, 24, and 26 may be interconnected (physically, communicatively, and/or operatively) for inter-component communications.

Computing device 2 may include additional components not shown in FIG. 2 for clarity. For example, computing device 2 may include a battery to provide power to the components of computing device 2. Similarly, the components of computing device 2 shown in FIG. 2 may not be necessary in every example of computing device 2. For instance computing device 2 may not, in all examples, include network interface 26.

Although shown as separate components in FIG. 2, in some examples, one or more of keyboard application 8, gesture determination module 12, timing module 14, and surface area module 16 may be part of the same module. In some examples, one or more of keyboard application 8, gesture determination module 12, timing module 14, surface area module 16, and one or more processors 20 may be formed in a common hardware unit. In certain examples, one or more of keyboard application 8, gesture determination module 12, timing module 14, and surface area module 16 may be software and/or firmware units that are executed on or operable by one or more processors 20.

One or more processors 20 may include, in certain examples, any one or more of a microprocessor, a controller, a digital signal processor (DSP), an application specific integrated circuit (ASIC), a field-programmable gate array (FPGA), or equivalent discrete or integrated logic circuitry. One or more processors 20 may be configured to implement functionality and/or process instructions for execution within computing device 2. For example, one or more processors 20 may be capable of processing instructions stored in memory 22 or instructions stored in one or more storage devices 24.

Memory 22, in one example, is configured to store information within computing device 2 during operation. Memory 22, in some examples, is described as a computer-readable storage medium. In some examples, memory 22 is a temporary memory, meaning that a primary purpose of memory 22 is not long-term storage. Memory 22, in some examples, is described as a volatile memory, meaning that memory 22 does not maintain stored contents when the computer is turned off. Examples of volatile memories include random access memories (RAM), dynamic random access memories (DRAM), static random access memories (SRAM), and other forms of volatile memories known in the art. In some examples, memory 22 is used to store program instructions for execution by one or more processors 20. Memory 22, in one example, is used by software or applications running on computing device 2 (e.g., keyboard application 8) to temporarily store information during program execution.

One or more storage devices 24, in some examples, also include one or more computer-readable storage media. One or more storage devices 24 may be configured to store larger amounts of information than memory 22. One or more storage devices 24 may further be configured for long-term storage of information. In some examples, one or more storage devices 24 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes network interface 26. Computing device 2, in one example, utilizes network interface 26 to communicate with external devices via one or more networks, such as one or more wireless networks. Network interface 26 may be a network interface card, such as an Ethernet card, an optical transceiver, a radio frequency transceiver, or any other type of device that can send and receive information. Other examples of such network interfaces may include Bluetooth, 3G and WiFi radios in mobile computing devices as well as USB. In some examples, computing device 2 utilizes network interface 26 to wirelessly communicate with an external device (not shown) such as a server, mobile phone, or other networked computing device.

Computing device 2 may further include keyboard application 8, executable by computing device 2, such as by one or more processors 20. Keyboard application 8 may include gesture determination module 12, timing module 14, and surface are module 16. Gesture determination module 12 may receive one or more inputs, such as from input device 4 or output device 6 (e.g., a touch sensitive display), and may determine that the one or more inputs comprise a gesture. Examples of gestures may include, but are not limited to, tap gestures, sliding gestures, circular gestures, and the like.

As one example, keyboard application 8, executing on one or more processors 20, may cause a touch-sensitive display of computing device 2, such as output device 6, to display a graphical keyboard. Gesture determination module 12 may receive an input from output device 6 indicating that a displayed character of the graphical keyboard has been touched, such as by a finger, stylus, pen, or the like. Gesture determination module 12 may determine that a tap gesture has been performed when the selected character has been released. As another example, after receiving an input from output device 6 indicating that a displayed character has been touched, gesture determination module 12 may determine that a sliding gesture has been performed when the selected character is released by sliding the input device off the selected character while maintaining contact with output device 6.

Timing module 14 may determine the duration of the gesture. For example, gesture determination module 12 may determine when a gesture has begun, such as when output device 6 indicates an input on the touch-sensitive display. In response, timing module 14 may begin to determine a start time of the gesture. At a later time, gesture determination module 12 may receive an indication from output device 6 that the gesture has ended, such as when a displayed character of a graphical keyboard has been released. In response, timing, module 14 may determine an end time of the gesture. Timing module 14 may then determine a time duration of the gesture as the time interval between the start time of the gesture and the end time of the gesture.

In some examples, gesture determination module 12 may indicate that multiple gestures are being performed at once. For instance, a user may provide user inputs that include touching and releasing multiple displayed characters at the same time. In such examples, gesture determination module 12 may track the multiple gestures individually, and timing module 14 may determine the durations of each individual gesture.

Surface area module 16 may determine a surface area of a portion of a touch-sensitive display (e.g., output device 6) that is in contact with an input unit. For example a user may touch output device 6 with a finger, stylus, or other input device. In some examples, output device 6 may indicate a radius of a contact area between the input device and output device 6. For instance, the contact area may be an area of the touch-sensitive display where the detected capacitance of the touch-sensitive display changes responsive to the surface area of the input unit (e.g., a finger). In such examples, surface area module 16 may determine the surface area of the portion of output device 6 that is in contact with the input unit using the radius indicated by output device 6. In certain examples, output device 6 may indicate a number of pixels or other units of known area of output device 6 that are in contact with the input unit. Surface area module 16 may determine the surface area of the portion of output device 6 that is in contact with the input unit, such as by summing the number of units of known area.

Surface area module 16 may determine a change in surface area of the portion of output device 6 that is in contact with the input unit. For instance, a user may rest his or her fingers on one or more displayed characters of a graphical keyboard displayed by output device 6, and may press down with one or more fingers. The accompanying increase in force may cause the surface area of the user's fingers that are in contact with output device 6 to increase. In another example, a user may rest his or her fingers on the touch-sensitive display, and may merely shift or roll his or her fingers through normal body movements. In such an example, the surface area of the user's fingers that are in contact with output device 6 may increase or decrease.

Surface area module 16 may compare the detected change in the surface area of the portion of output device 6 that is in contact with the input unit to a minimum value and a maximum value. In some examples, when the change in the surface area is less than the minimum value, surface area module 16 may configure keyboard application 8 to cause computing device 2 to refrain from selecting as user input the one or more displayed character keys that are in contact with the input unit. In certain examples, when the change in the surface area is greater than the maximum value, surface area module 16 may configure keyboard application 8 to cause computing device 2 to refrain from selecting as user input the one or more displayed character keys that are in contact with the input unit. In some examples, when the change in the surface area is greater than or equal to the minimum value and less than or equal to the maximum value, surface area module 16 may configure keyboard application 8 to cause computing device 2 to select as user input the one or more displayed character keys that are in contact with the input unit. The maximum and minimum values may include an absolute change in surface area (e.g., a change of 2 square millimeters), a percentage of change in surface area (e.g., a ten percent change in surface area), or other types of measurements that can detect a relative change in surface area. In certain examples, surface area module 16 receive an input from output device 6 indicating a change in the radius of a contact area between the input device and output device 6, and may determine whether the selected object of the output device should be selected as user input using the change in radius.

Figure 3:
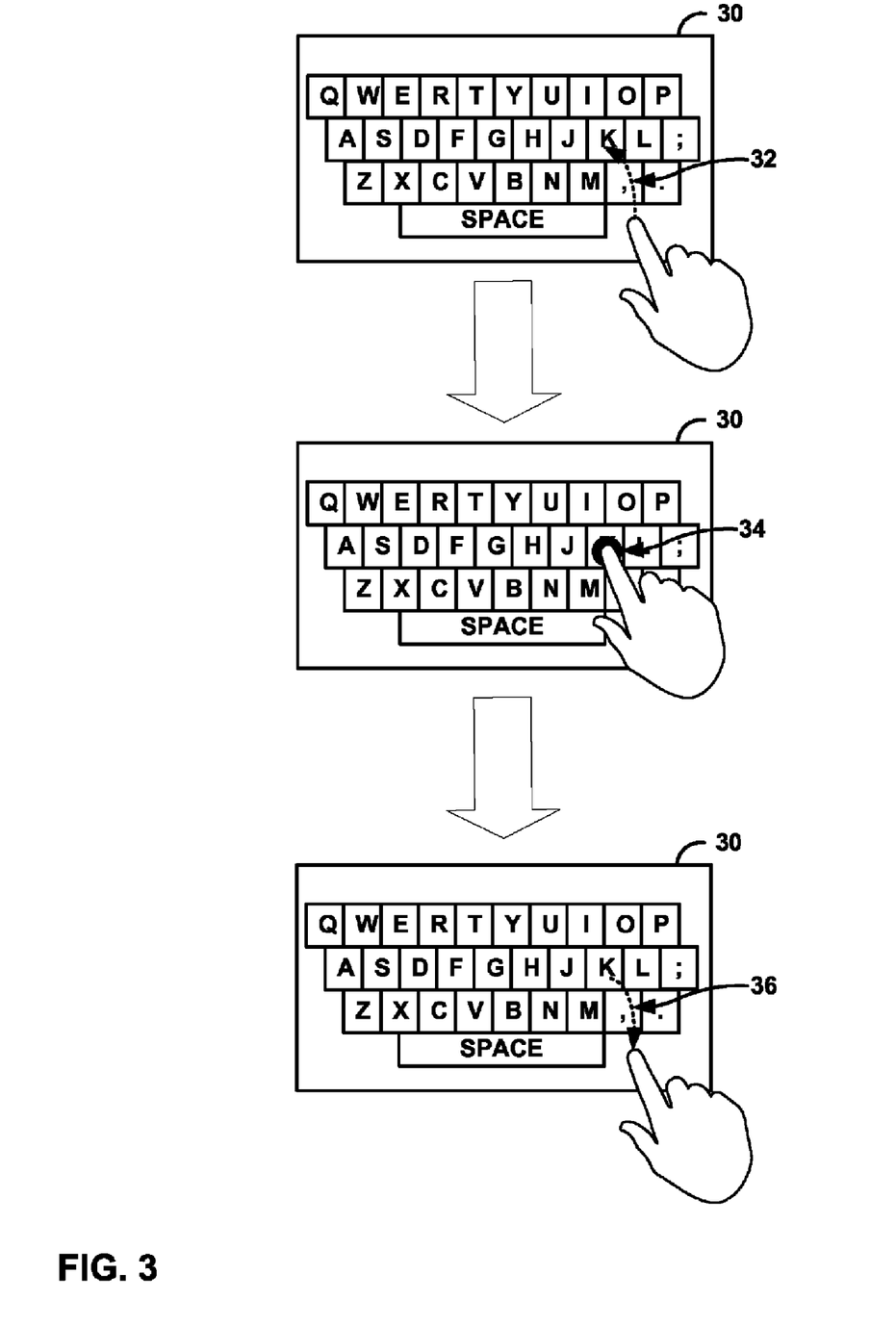
FIG. 3 is a block diagram illustrating an example of a keyboard application.

FIG. 3 is a block diagram illustrating an example of a keyboard application. For purposes of illustration, the example keyboard application is described below within the context of computing device 2 of FIG. 1 and FIG. 2. Keyboard application 8, executing on one or more processors 20, may provide one or more signals to cause a touch-sensitive display, such as output device 6, to display graphical keyboard 30. As illustrated in FIG. 3, a user may perform a gesture, such as a tap gesture, at a location of the touch-sensitive display (e.g., output device 6) that displays one or more of the characters of the graphical keyboard. A tap gesture may be defined as touching the touch-sensitive display at one or more of the displayed characters with an input unit (a finger in the illustrated example) and releasing the character by removing the input unit from the touch-sensitive display. In certain examples, a user may perform a sliding gesture (not illustrated), such as by releasing the character by removing the input unit from the selected character while maintaining contact between the input unit and the touch-sensitive display.

In the illustrated example of FIG. 3, a tap gesture begins with gesture 32, where a user begins to initiate touching graphical keyboard 30 at the displayed character "k". At gesture 34, the user has made contact with the displayed letter "k" of graphical keyboard 30. Gesture determination module 12 may determine that a gesture, such as the illustrated tap gesture, has begun when output device 6 provides one or more signals indicating that an input device has made contact with the touch-sensitive display. In certain examples, as when output device 6 includes a presence-sensitive display, gesture determination module 12 may determine that a gesture has begun when output device 6 provides one or more signals indicating that an input device has come into a detectable range of the presence-sensitive device.

In the example of FIG. 3, timing module 14 may begin to determine the duration of the gesture at gesture 34 when gesture determination module 12 indicates that a gesture has begun. For instance, timing module 14 may cause computing device 2 to store a start time at a memory or other storage device of computing device 2, such as at one or more of memory 22 or one or more storage devices 24. At gesture 36, a user has released the displayed character "k" by removing his or her finger from the touch-sensitive display. Gesture determination module 12 may determine that a tap gesture has been performed because the input unit (a finger in the illustrated example) was removed from the selected character by removing the input unit from the touch-sensitive display. Gesture determination module 14 may cause computing device 2 to store an end time, such as at one or more of memory 22 or one or more storage devices 24. In certain examples, gesture determination module 14 may determine that a sliding gesture has been performed when the selected character is released by removing the input unit from the selected character while maintaining contact between the input unit and the touch-sensitive display (not illustrated). Timing module 14 may determine the duration of the gesture by determining the time interval between when start time of the gesture (e.g., gesture 34) and the end time of the gesture (e.g., gesture 36).

Timing module 14 may compare the duration of the gesture to a maximum timeout value, and may cause computing device 2 to refrain from selecting as user input the selected character when the duration of the gesture is greater than the maximum timeout value. For example, a user may rest his or her fingers on the home row keys of graphical keyboard 30. If the user removes one or more of his or her fingers from the home row keys, output device 6 may provide one or more signals to gesture determination module 12 indicating that one or more input devices (e.g., one or more of the user's fingers) have been removed from output device 6. Gesture determination module 12 may determine that one or more tap gestures have been performed at the home row keys. Similarly, a user may slide one or more of his or her fingers off the home row keys while maintaining contact between graphical keyboard 30 and the user's fingers. In such an example, gesture determination module 12 may determine that one or more sliding gestures have been performed at the home row keys. In certain examples, timing module 14 may cause computing device 2 to refrain from selecting as user input the one or more selected characters when the duration of the gesture is greater than or equal to the maximum timeout value (e.g., three hundred milliseconds). In some examples, timing module 14 may cause computing device 2 to select as user input the selected character when the duration of the gesture is less than or equal to the maximum timeout value.

In some examples, timing module 14 may compare the duration of the gesture to a minimum timeout value, and may cause computing device 2 to refrain from selecting as user input the selected character when the duration of the gesture is less than the minimum timeout value. For example, a user may inadvertently touch graphical keyboard 30 with a finger or other input unit. In response, output device 6 may provide one or more signals that may be received by gesture determination module 12 indicating that a tap gesture has been performed. However, in such an example, the time duration of the gesture may be very brief. Timing module 14 may cause computing device 2 to refrain from selecting the selected character as user input when the duration of the gesture is less than a minimum timeout value (e.g., 100 milliseconds). As another example, timing module 14 may cause computing device 2 to select as user input the selected character when the duration of the gesture is greater than the minimum timeout value.

In some examples, timing module 14 may compare the duration of the gesture to both a minimum timeout value and a maximum timeout value. In such an example, timing module 14 may cause computing device 2 to refrain from selecting as user input the selected character when the duration of the gesture is less than the minimum timeout value or greater than the maximum timeout value. In another example, timing module 14 may cause computing device 2 to select as user input the selected character when the duration of the gesture is greater than or equal to the minimum timeout value and less than or equal to the maximum timeout value. As such, the user may rest his or her fingers on the touch-sensitive display (e.g., on the home row keys), such as to prevent wrist fatigue, without registering unintended key presses.

The minimum and maximum timeout values (e.g., the minimum timeout value required to register a user input and the maximum timeout value within which a gesture must be performed to register a user input) may be a preconfigured values. For instance, the minimum timeout value may be preconfigured as a value of one hundred milliseconds, and the maximum timeout value may be preconfigured as a value of three hundred milliseconds. In some examples, the minimum and maximum timeout values may be configured by a user. For instance, keyboard application 8 may cause output device 6 to display a user interface enabling a user to increase or decrease one or more of the minimum and maximum timeout values.

Figure 4:
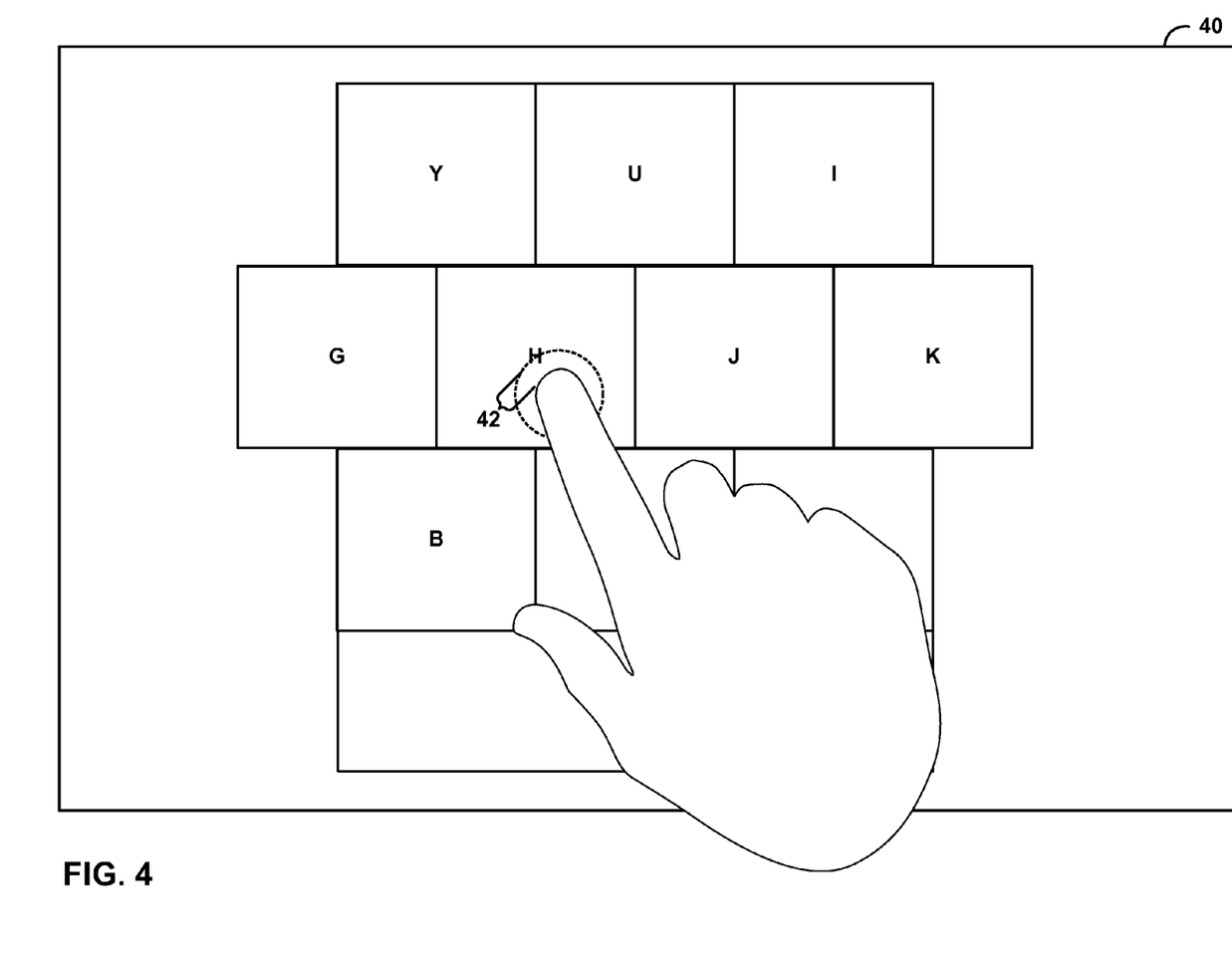
FIG. 4 is a conceptual diagram illustrating an example of a keyboard application.

FIG. 4 is a conceptual diagram illustrating an example of a keyboard application, in accordance with one or more aspects of the present disclosure. For purposes of illustration, the example keyboard application is described below within the context of computing device 2 of FIG. 1 and FIG. 2. Keyboard application 8, executing on one or more processors 20, may cause a touch-sensitive display, such as output device 6, to display graphical keyboard 40. For purposes of illustration, graphical keyboard 40 illustrated in FIG. 4 includes only a portion of a standard keyboard. As illustrated in FIG. 4, a user may provide a user input comprising a gesture at one or more of the displayed characters of graphical keyboard 40 (e.g., the "H" character) using an input unit (a finger in the illustrated example). Surface area module 16 may determine a surface area of a portion of the touch-sensitive display (e.g., output device 6) that is in contact with the input unit. In the example of FIG. 4, surface area module 16 may determine the surface area of the portion of output device 6 that is underneath the user's finger and in contact with output device 6.

A user may provide an input comprising a gesture, such as by providing a motion of the input unit. For instance, a user may move his or her finger by pressing down on the displayed character of graphical keyboard 40. Such a motion may correspond to a user pressing down to select the displayed character. The accompanying increase in pressure may cause the surface area of the user's finger that is in contact with output device 6 to increase. In the example of FIG. 4, surface area change 42 illustrates an example change in surface area in response to an increased pressure of the user's motion of pressing down on the displayed character "H" with the user's finger. Surface area module 16 may determine the change in the surface area of the portion of the touch-sensitive display (e.g., surface area change 42), and may compare the change in the surface area to one or more of a minimum or maximum value.

In some examples, surface area module 16 may compare the change in the surface area to a minimum value, and may cause computing device 2 to refrain from selecting as user input the selected character when the change in the surface area is less than the minimum value. As one example, an increase in the detected surface area may correspond to a user pressing down with an input unit, such as a finger, to select a displayed character. However, a user may apply an increased pressure without intending to select a character. For instance, a user may unconsciously apply slightly more pressure to his or her fingers as the user shifts body posture. Such increases in pressure may cause an increase in the surface area between the user's fingers and the touch-sensitive display, which may be interpreted as a gesture by gesture determination module 12. Similarly, a user may unintentionally increase the surface area in contact between the touch-sensitive display and the user's fingers by rolling his or her fingers or otherwise repositioning his or her fingers on the touch-sensitive display. Surface area module 16 may help prevent unintended key presses by comparing the increased surface area to a minimum value, and causing computing device 2 to select the gesture as user input only if the increased surface area is greater than or equal to the minimum value (e.g., two square millimeters). In such case, it is more likely that the increased surface area is due to a deliberate gesture of the user.

In certain examples, surface area module 16 may compare the change in the surface area to a maximum value, and may cause computing device 2 to refrain from selecting as user input the selected character when the change in the surface area is greater than the maximum value. For instance, a user may touch a displayed character of graphical keyboard 40 with his or her finger. Surface area module 16 may receive one or more signals from output device 6 indicating a radius of the touch point, and may calculate a surface area of the touch point using the one or more received signals indicating the radius. However, the user may, in some examples, increase the surface area of the touch point by placing the user's wrist or palm on the graphical keyboard. In such case, surface area module 16 may cause computing device 2 to refrain from selecting the selected character as user input when the change in the surface area is greater than a maximum value. Such a determination may prevent erroneous users inputs, in that surface area module 16 may determine that a change in surface area greater than the maximum value may not have been caused by a user pressing down with a finger or other typical input device, and may determine that the selection is not a desired user input.

In some examples, surface area module 16 may compare the change in surface area to the minimum value and maximum value, and may cause computing device 2 to select as user input the selected character when the change in surface area is greater than or equal to the minimum value and less than or equal to the maximum value. The minimum and maximum values may be preconfigured values. For instance, the minimum value may be preconfigured as a value of two square millimeters, and the maximum timeout value may be preconfigured as a value of ten square millimeters. In some examples, the minimum and maximum values may be configured by a user. For instance, keyboard application 8 may cause output device 6 to display a user interface enabling a user to increase or decrease one or more of the minimum and maximum values.

In certain examples, surface area module 16 may cause computing device 2 to refrain from selecting as user input a selected character key of graphical keyboard 40 when a detected change in surface not greater than or equal to a minimum value and less than a maximum value within a time duration that is greater than or equal to a minimum timeout value and less than or equal to a maximum timeout value. As one example, surface area module 16 may receive from output device 6 one or more signals indicating a radius of a touch point, and may calculate the surface area of the touch point using the radius. Surface area module 16 may cause timing module 14 to determine a time that the touch point was registered. Surface area module 16 may determine a change in the detected surface area, and may compare the surface area change to minimum and maximum values. Surface area module 16 may determine that the change in the surface area is greater than or equal to the minimum value and less than or equal to the maximum value, and may cause timing module 14 to determine a time that the change in the surface area satisfied the surface area condition (e.g., the time that the change in the surface area was determined to be greater than or equal to the minimum value and less than or equal to the maximum value).

Surface area module 16 may determine the duration of the gesture (i.e., pressing down on the displayed character to select the displayed character), and may compare the duration of the gesture to minimum and maximum timeout values. In some examples, when the duration of the gesture is greater than the maximum timeout value, surface area module 16 may cause computing device 2 to refrain from selecting the gesture as user input. For instance, a user may have applied more pressure to his or her fingers, causing a greater surface area to be detected by surface area module 16. However, the user may have done so over a relatively long period of time, such that the gesture was not intended as user input. In such an example, surface area module 16 may help to eliminate inadvertent key presses by comparing the duration of the gesture to the threshold time value. Similarly, when the duration of the gesture is less than the minimum timeout value, surface area module 16 may cause computing device 2 to refrain from selecting the gesture as user input.

In other examples, surface area module 16 may compare the duration of the gesture to the minimum timeout value and maximum timeout value, and may cause computing device 2 to select the gesture as user input when the duration of the gesture is greater than or equal to the minimum timeout value and less than or equal to the maximum timeout value. As such, surface area module 16 may cause computing device 2 to refrain from selecting as user input a gesture comprising a change in surface area of output device 6 that is in contact with an input unit when the change in surface area is less than a minimum surface area value or greater than a maximum surface area value. When the change in surface area is greater than or equal to the minimum surface area value and less than or equal to the maximum value, surface area module 16 may cause computing device 2 to refrain from selecting the gesture as user input when the time duration of the gesture is less than a minimum timeout value or greater than a maximum timeout value. When the time duration of the gesture is greater than or equal to the minimum timeout value and less than or equal to the maximum timeout value, surface area module 16 may cause computing device 2 to select the gesture as user input.

In certain examples, when surface area module 16 determines that the change in surface area of a gesture comprising a change in surface area of an area of output device 6 that is in contact with an input unit is greater than or equal to a minimum value and less than or equal to a maximum value, but the time duration of the gesture less than a minimum timeout value or greater than a maximum timeout value, surface area module 16 may use the currently detected surface area of output device 6 that is in contact with the input unit as a new, resting surface area for future comparisons. For instance, a user may increase the surface area of the user's fingers that are in contact with graphical keyboard 40 by more than an amount of surface area that is greater than a minimum surface area value over a period of time that is greater than a maximum timeout value, such as by shifting body posture causing an increased pressure on output device 6. In such an example, surface area module 16 may cause computing device 2 to refrain from selecting the gesture as user input, and may use the newly detected surface area of output device 6 that is in contact with the input unit as the basis of comparison for future gestures.

In certain examples, one or more of the minimum or maximum timeout values may be the same or different values. For instance, both minimum and maximum timeout values may be utilized. Similarly, both minimum and maximum surface area values may be utilized. One or more of the minimum timeout value, maximum timeout value, minimum surface area value, or maximum surface area value may be preconfigured, may be configurable by a user (e.g., using a user interface presented by output device 8), or both.

Surface area module 16 may, in some examples, cause computing device 2 to as user input a gesture including a change in surface area detected between output device 6 and an input unit when surface area module 16 receives one or more signals from output device 6 indicating an increase in the surface area detected between output device 6 and the input unit followed by a decrease in the surface area detected between output device 6 and the input unit. For instance, a user may press down on a displayed character of graphical keyboard 40 with an input unit (e.g., a finger) to select the displayed character, and may decrease the pressure applied by the input unit after making the selection (e.g., as when pressing down on a key of a traditional keyboard to select a character). Surface area module 16 may determine that a gesture has been performed to select the displayed character when surface area module 16 receives one or more signals from output device 6 indicating an increase in surface area between output device 6 and the input unit that is greater than a threshold value followed by one or more signals from output device 6 indicating a decrease in surface area between output device 6 and the input unit that is greater than a threshold value. Surface area module 16 may cause computing device 2 to select such a gesture as user input. In some examples, the two threshold values may be the same or different values. Similarly, the threshold values may be preconfigured, configurable through a user interface presented by output device 6, or both.

The examples described above have been described with respect to a graphical keyboard displayed by a touch-sensitive or presence-sensitive display. However, it should be recognized that the examples described above may be applied to any selectable objects displayed by such displays. For example, computing device 2 may include one or more applications, executable by one or more processors 20, that cause output device 6 to display one or more selectable objects. Examples of such selectable objects include, but are not limited to, virtual buttons, hyperlinks, drop-down list controls, taskbars, menu bars, and the like. Computing device 2 may implement the examples described above with respect to keyboard application 8 to enable a user to rest one or more input devices (e.g., one or more of the user's fingers, a stylus, a pen, and the like) on output device 6 without causing computing device 2 to register unintended selections of the selectable objects. For instance, computing device 2 may cause one or more processors to execute instructions comprising a web browsing application. The instruction may cause output device 6 to display one or more selectable objects, such as virtual buttons and hyperlinks. Computing device 2 may utilize the examples described above to enable a user to rest an input device on output device 6 without causing computing device 2 to register an unintended key press (e.g., using a gesture determination module, a timing module, a surface area module, or any combination thereof). As such, techniques of this disclosure may enable a user of computing device 2 to rest one or more input devices on the touch-sensitive display without unintentionally causing computing device 2 to select one or more selectable objects displayed by the touch-sensitive display.

Figure 5:
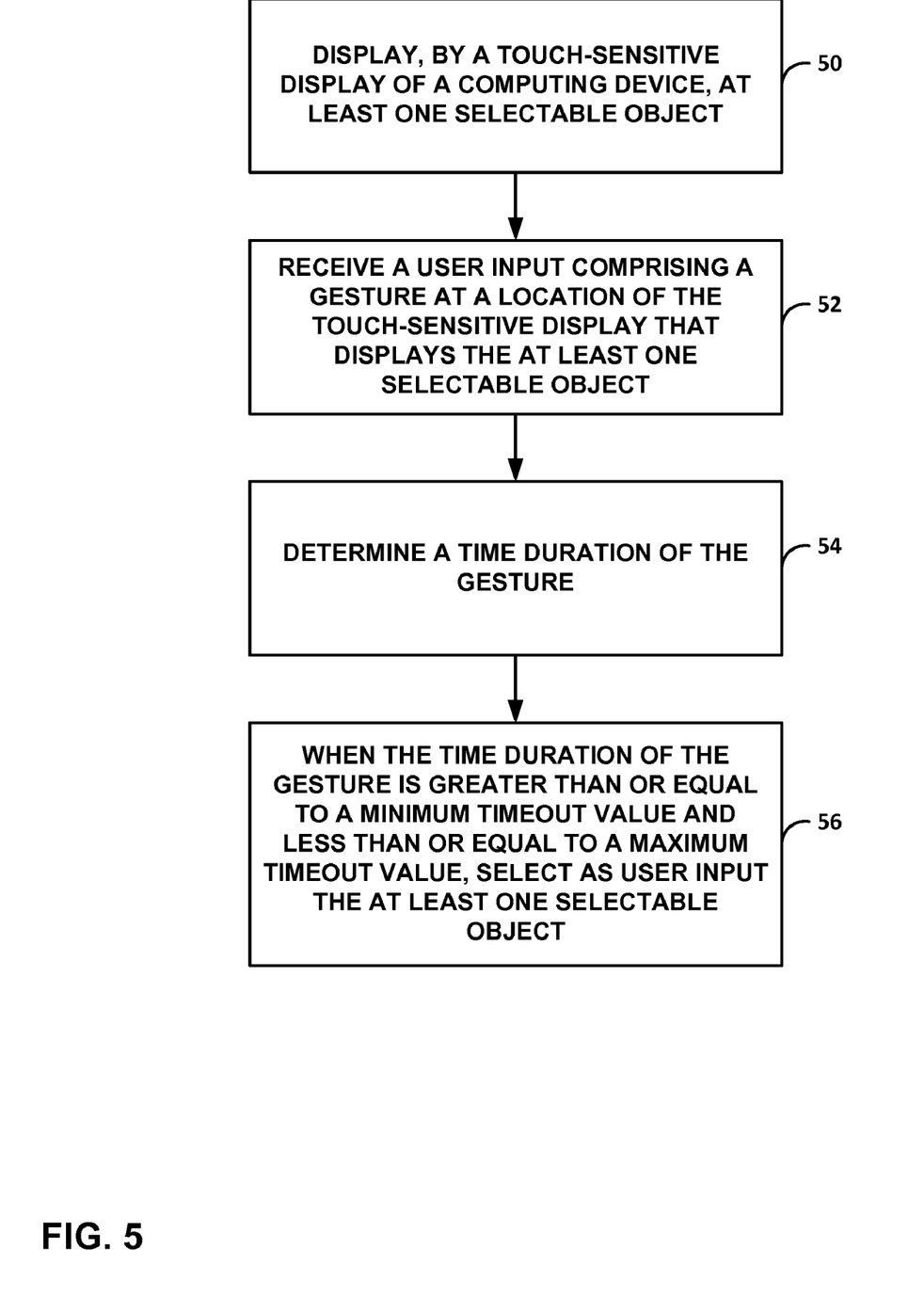
FIG. 5 is a flow diagram illustrating an example operation of a computing device that is configured to execute a keyboard application.

FIG. 5 is a flow diagram illustrating an example operation of a computing device that is configured to execute a keyboard application. For example, the process illustrated in FIG. 5 may be performed by computing device 2 shown in FIGS. 1 and/or 2.

The process of FIG. 5 includes displaying, by a touch-sensitive display of a computing device, at least one selectable object (50). For instance, keyboard application 8 may cause a touch-sensitive display such as output device 6 to display a graphical keyboard including at least one selectable character key. The process further includes receiving, by the computing device, a user input comprising a gesture at a location of the touch-sensitive display that displays the at least one selectable object (52). For example, output device 6 may receive one or more user inputs including a touch input from an input device (e.g., one or more of a user's fingers). Gesture determination module 12 may receive one or more signals from output device 6 indicating that the touch input has been received, and may determine that the input comprises a gesture, such as a tap gesture (i.e., selecting and releasing the displayed character), a sliding gesture (i.e., releasing the selected character while maintaining contact with output device 6), or a gesture that includes pressing down on output device 6 to select a displayed character.

The process further includes determining, by the computing device, a time duration of the gesture (54). As one example, gesture determination module 12 may cause timing module 14 to determine a time corresponding to the beginning of the gesture (e.g., a time when the displayed character was touched) and a time corresponding to the end of the gesture (e.g., a time when the displayed character was released). Timing module 14 may determine the time duration of the gesture by comparing the two times.

The process further includes, when the time duration of the gesture is greater than or equal to a minimum timeout value and less than or equal to a maximum timeout value, selecting as user input the at least one selectable object (56). In some examples, when the time duration is less than the minimum timeout value, timing module 14 may cause computing device 2 to refrain from selecting as user input the at least one selectable object. As an example, a user may quickly touch output device 6 with a finger or other input device, and in so doing may provide a user input that may cause gesture determination module 12 to receive one or more signals from output device 6 indicating that a tap gesture or sliding gesture has been performed. Gesture determination module 12 may cause timing module 14 to determine a time duration of the gesture, and to compare the time duration of the gesture to a minimum timeout value. When the time duration of the gesture is less than the minimum timeout value, timing module 14 may cause computing device 2 to refrain from selecting the gesture as user input.

In some examples, when the time duration of the gesture is greater than a maximum timeout value, timing module 14 may cause computing device 2 to refrain from selecting as user input the at least one selectable object. For instance, a user may rest his or her fingers on the home row keys of a graphical keyboard displayed by output device 6, and may later remove one or more fingers from the home row keys. Gesture determination module 12 may receive one or more signals from output device 6 indicating that the user has performed a gesture, such as a tap gesture. Gesture determination module 12 may cause timing module 14 to determine a time duration of the gesture, and to compare the time duration of the gesture to a maximum timeout value. When the time duration of the gesture is greater than the maximum timeout value, timing module 14 may cause computing device 2 to refrain from selecting the gesture as user input.

Figure 6:
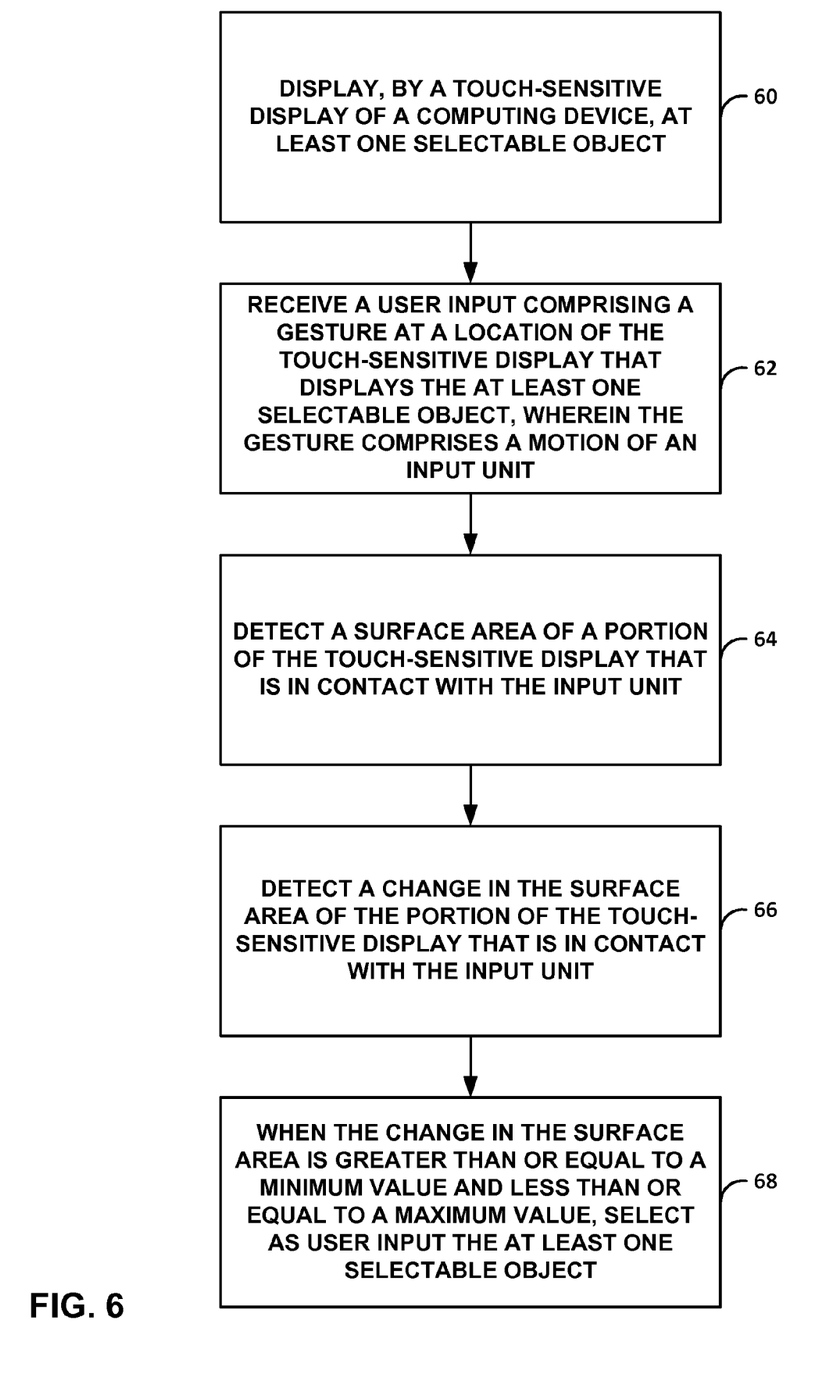
FIG. 6 is a flow diagram illustrating an example operation of a computing device that is configured to execute a keyboard application.

FIG. 6 is a flow diagram illustrating an example operation of a computing device that is configured to execute a keyboard application. For example, the process illustrated in FIG. 6 may be performed by computing device 2 shown in FIGS. 1 and/or 2. The process of FIG. 6 includes displaying, by a touch-sensitive display of a computing device, at least one selectable object (60). For instance, keyboard application 8 may cause a touch-sensitive display such as output device 6 to display a graphical keyboard including at least one selectable character key. In some examples, one or more other applications, executing on one or more processors 20, may cause output device 6 to display at least one selectable object, such as at least one of a hyperlink, virtual button, dropdown list control, taskbar, and the like.

The process further includes receiving, by the computing device, a user input comprising a gesture at a location of the touch-sensitive display that displays the at least one selectable object, wherein the gesture comprises a motion of an input unit (62). For example, a user may touch one or more of the selectable objects with an input unit (e.g., a finger, a pen, a stylus, and the like), and may move the input unit by pressing down with the input unit. Gesture determination module 12 may receive one or more signals from output device 6 indicating that a gesture, such as tap gesture, a sliding gesture, or a gesture including pressing down with an input unit to select a selectable object has been performed.

The process further includes detecting, by the computing device, a surface area of a portion of the touch-sensitive display that is in contact with the input unit (64). As an example, a user may touch a portion of a touch-sensitive display (e.g., output device 6) with an input unit, such as a finger. Surface area module 16 may receive one or more signals from output device 6 indicating a radius of the surface area of output device 6 that is in contact with the input unit and may determine the surface area based on the radius. The process further includes detecting, by the computing device, a change in the surface area of the portion of the touch-sensitive display that is in contact with the input unit (66). For instance, a user may touch output device 6 with an input unit, such as one or more of his or her fingers.

The user may subsequently push down with one or more fingers (e.g., to select a displayed selectable object such as a character key of a graphical keyboard). The accompanying increase in pressure caused by the user pressing down may cause the surface area of the user's finger that is in contact with output device 6 to increase. Surface area module 16 may receive one or more signals from output device 6 indicating a new radius of the touch point, and may determine a change in the surface area by comparing the two surface area values.

The process further includes when the change in the surface area is greater than or equal to a minimum value and less than or equal to a maximum value, selecting as user input the at least one selectable object (68).

For example, surface area module 16 may receive one or more signals from output device 6 indicating a change in the surface area of output device 6 that is in contact with the input unit, and may compare the change in the surface area to a minimum value. When the change in the surface area is less than the minimum value, surface area module 16 may cause computing device 2 to refrain from selecting the gesture as user input. Similarly, surface area module 16 may compare the change in the surface area to a maximum surface area value, and may cause computing device 2 to refrain from selecting the gesture as user input when the change in surface area is greater than the maximum surface area value.

In some examples, the process further includes refraining from selecting as user input the at least one selectable object when a gesture including a change in the surface area of the touch-sensitive display that is in contact with the input unit does not complete within a time duration that is greater than or equal to a minimum timeout value and less than or equal to a maximum timeout value. For instance, a user may increase the pressure applied to output device 6 by one or more of the user's fingers over a relatively long period of time. Such increase in pressure may be due to factors such as a change in body posture, a change in the position of the user's wrists or hands, or one or more other factors. The increase in pressure may result in an increased surface area of the user's fingers that are in contact with output device 6. Surface area module 16 may receive one or more signals from output device 6 indicating the change in the surface area of output device 6 that is in contact with the input unit, and may determine that the change in surface area is greater than or equal to a minimum value and less than or equal to a maximum value. Surface area module 16 may cause timing module 14 to determine the duration of the gesture (i.e., the time duration from the time of the initial touch to the time when the surface area of output device 6 that is in contact with the input unit is determined to be greater than or equal to the minimum value and less than or equal to the maximum value). Timing module 14 may cause computing device 2 to refrain from selecting the gesture as user input when the time duration of the gesture is greater than or equal to a maximum timeout value or less than or equal to a minimum timeout value. In some examples, surface area module 16 may receive one or more signals from output device 6 indicating a surface area of output device that is in contact with the input unit, and may use the currently determined surface area of output device 6 that is in contact with the input unit (e.g., the currently determined surface area of output device 6 that is in contact with one or more of the user's fingers) as the new, baseline surface area for future comparisons.

In certain examples, the process further includes detecting an increase in the surface area of the portion of the touch-sensitive display that is in contact with the input unit followed by a decrease in the surface area of the portion of the touch-sensitive display that is in contact with the input unit. For instance, a user may touch a touch-sensitive display (e.g., output device 6) with an input unit, such as a finger. The user may provide a user input comprising a gesture to select a displayed selectable object that includes pressing down with the input unit followed by releasing pressure applied by the input unit (e.g., as when pressing down with a finger on a traditional keyboard to select a character key). The increase and decrease in pressure may cause a corresponding increase and decrease in surface area of the touch-sensitive display that is in contact with the input unit.

Surface area module 16 may receive one or more signals from the touch-sensitive display (e.g., output device 6) indicating the increase and decrease in surface areas, and may compare one or more of the increase and decrease in surface areas to one or more surface area values (e.g., one or more of a minimum value or a maximum value). Surface area module 16 may cause computing device 2 to select the gesture as user input when one or more of the increase and decrease in surface areas are greater than a minimum value and less than a maximum value.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electrically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

The invention claimed is:

1. A method comprising:
   displaying, by a touch-sensitive display of a computing device, at least one selectable object;
   receiving, by the computing device, a user input comprising a gesture at a location of the touch-sensitive display that displays the at least one selectable object, wherein the gesture comprises motion of an input unit;
   detecting, by the computing device, a surface area of a portion of the touch-sensitive display that is in contact with the input unit at the location of the touch-sensitive display;
   detecting, by the computing device, a change in the surface area of the portion of the touch-sensitive display that is in contact with the input unit at the location of the touch-sensitive display;
   if the change in the surface area is greater than or equal to a minimum value and less than or equal to a maximum value, selecting as user input, by the computing device, the at least one selectable object; and
   if the change in the surface area is less than the minimum value, refraining from selecting as user input, by the computing device, the at least one selectable object.

2. The method of claim 1, further comprising:
   if the change in the surface area is greater than the maximum value, refraining from selecting as user input, by the computing device, the at least one selectable object.

3. The method of claim 1, wherein at least one of the minimum value or maximum value comprises a surface area value.

4. The method of claim 1, further comprising:
   determining a radius of the portion of the touch-sensitive display that is in contact with the input unit; and
   determining the surface area of the portion of the touch-sensitive display that is in contact with the input unit based on the radius.

5. The method of claim 1, wherein detecting the change in the surface area of the portion of the touch-sensitive display that is in contact with the input unit further comprises determining a time duration of the change in the surface area.

6. A non-transitory computer-readable storage medium encoded with instructions that cause one or more processors of a computing device to:
   display, by a touch-sensitive display of the computing device, at least one selectable object;
   receive a user input comprising a gesture at a location of the touch-sensitive display that displays the at least one selectable object, wherein the gesture comprises motion of an input unit;
   detect a surface area of a portion of the touch-sensitive display that is in contact with the input unit at the location of the touch-sensitive display;
   detect a change in the surface area of the portion of the touch-sensitive display that is in contact with the input unit at the location of the touch-sensitive display;
   if the change in the surface area-is greater than or equal to a minimum value and less than or equal to a maximum value, select as user input the at least one selectable object; and
   if the change in the surface area is less than the minimum value, refrain from selecting as user input, by the computing device, the at least one selectable object.

7. A computing device, comprising:
one or more processors;
a touch-sensitive display to display at least one selectable object and receive a user input comprising a gesture at a location of the touch-sensitive display that displays the at least one selectable object; and
an application installed on the computing device and operable by the one or more processors to determine a surface area of a portion of the touch-sensitive display that is in contact with the input unit at the location of the touch-sensitive display, determine a change in the surface area of the portion of the touch-sensitive display that is in contact with the input unit at the location of the touch-sensitive display, if the change in the surface area is greater than or equal to a minimum value and less than or equal to a maximum value, select as user input the at least one selectable object, and if the change in the surface area is less than the minimum value, refrain from selecting as user input the at least one selectable object.

8. The method of claim 1, wherein the at least one object is included in a graphical keyboard.

9. The method of claim 1, wherein the at least one object comprises at least one of a character key or a hyperlink.

\* \* \* \* \*